ities of glass compositions suf-

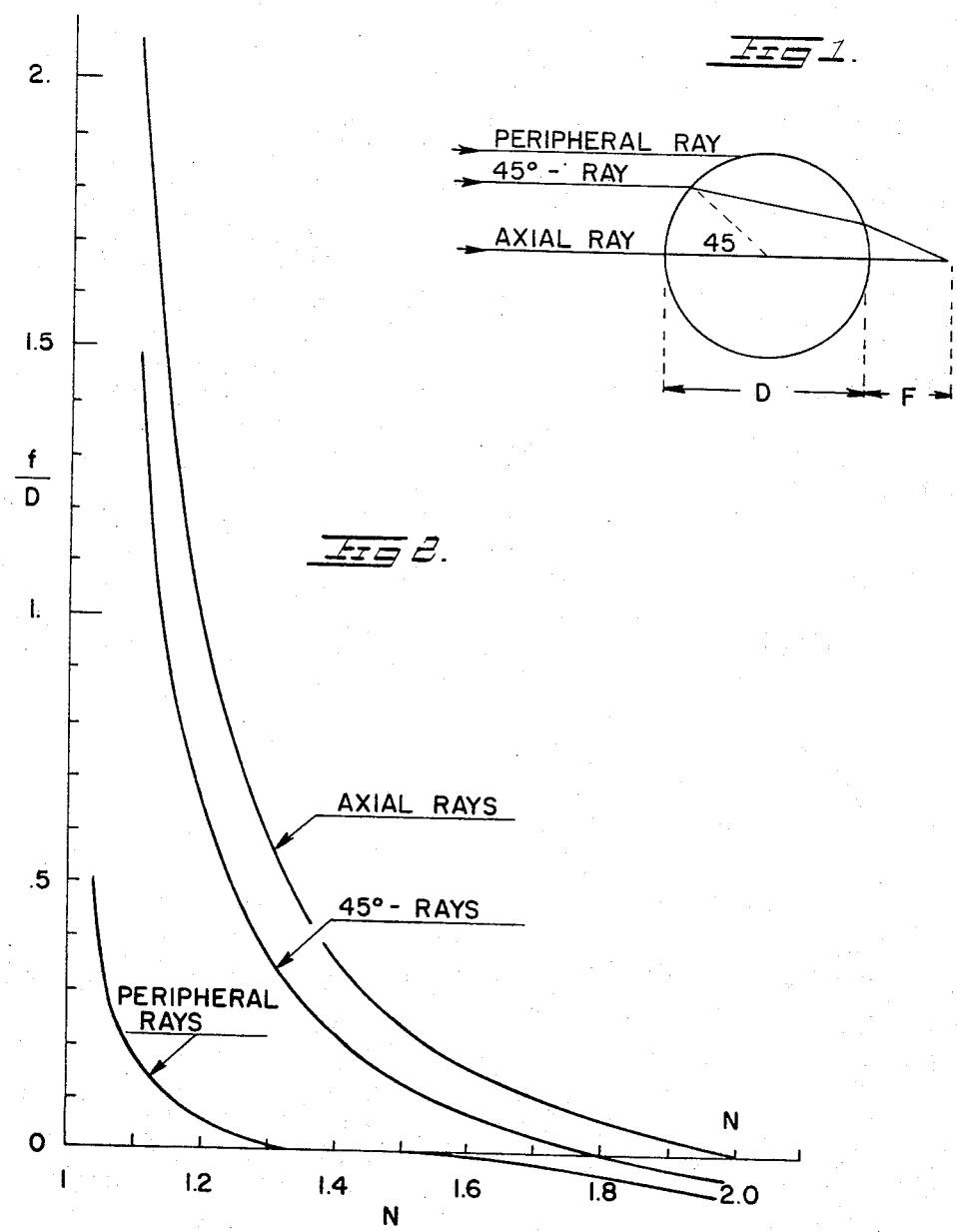

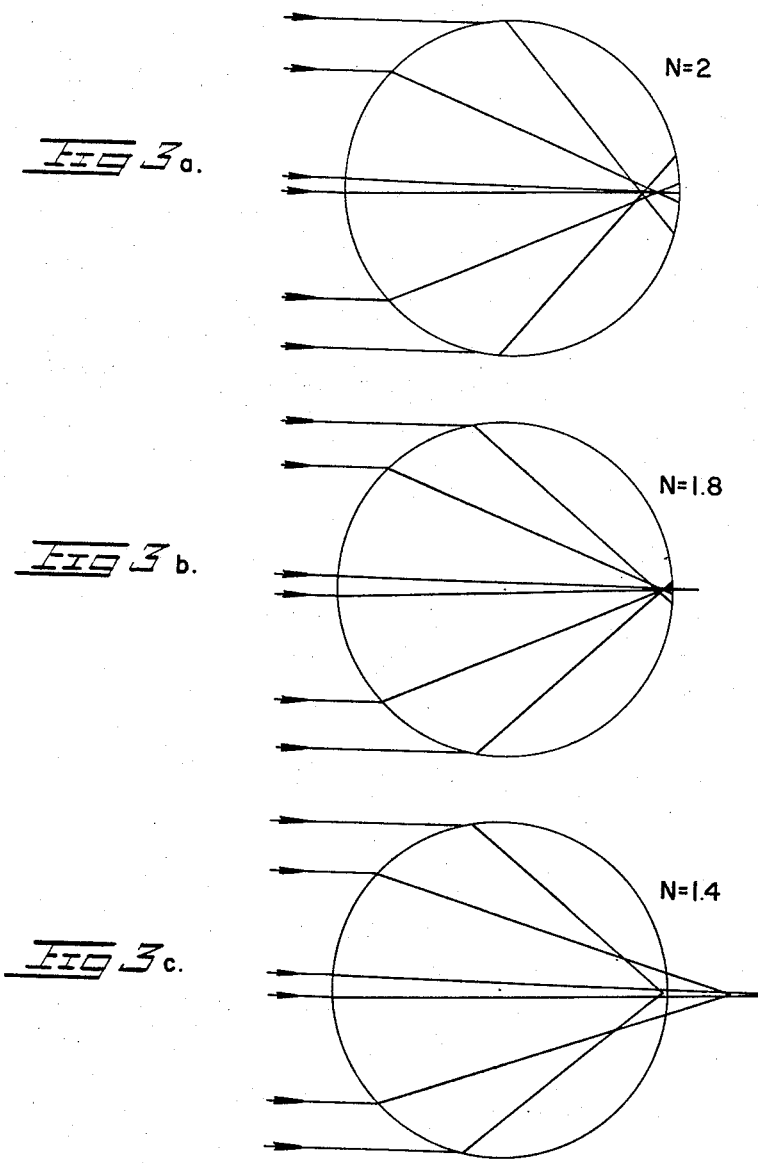

United States Patent Office 3,419,403
Patented Dec. 31, 1968

3,419,403
HIGH INDEX OF REFRACTION GLASS COMPOSITIONS
Charles E. Searight, Ezra M. Alexander, and John R. Ryan, Jackson, Miss., assignors to Cataphote Corporation, Toledo, Ohio, a corporation of Ohio
Filed Mar. 18, 1963, Ser. No. 265,888
3 Claims. (Cl. 106—47)

The present invention relates to novel glass compositions particularly useful for the manufacture of retro-reflective lens elements, which are used to illuminate objects at night. Traffic signs are usually reflectorized with high index glass beads and will serve as an example of an illuminated object. Due to the high dielectric constants of many of these glasses, various electronic elements may also be manufactured from them. Criteria for glass beads used as retro-reflective lens elements include high refractive index, good chemical and physical durability which enable the glasses to resist weathering, good clarity, and good glass bead making qualities such as high surface tension, low specific heat, and low viscosity.

Glass beads act as optical lens elements in such a way as to focus the light coming from a distant source to a point close to the back surface of the sphere. In a retro-reflective system, the light is focused by the beads to a point at its back surface, i.e., that portion of the bead which is the most distant from the light source, where the light beam is concentrated on the face of a reflector such as tin foil where it is reflected or returned through the beads in a direction essentially parallel to that of the incoming light. A retro-reflective system of this type will operate efficiently if the light is focused at, or close to, the back surface of the spherical beads, and if the medium behind the beads has a high reflecting power for the focused light.

The principle of the invention will be more particularly described with reference to the accompanying drawing in which:

FIG. 1 is a diagrammatical representation of the geometrical optics of the spherical lens;

FIG. 2 is a graph of the relative focal distance $f/D$ of a spherical lens as a function of the effective refractive index N; and FIGS. 3a, 3b and 3c are diagrams showing the computed trajectories of the axial, 45° and peripheral rays through spheres of effective indices of refraction $N=2$, 1.8 and 1.4, respectively.

It is well known that the first condition requires that the beads are made of glass having a high index of refraction. The geometrical optics of the spherical lens gives the following formula for the focal distance of the axial rays:

$$f = r\frac{2-N}{2N-2} \quad (1)$$

Here $f$ denotes the distance of the focus from the back surface of the sphere, $r$ the radius of the sphere, and $N=n/n_0$, the effective refractive index. The effective index N is the ratio of the index of the material of which the beads are made to that of the surrounding medium.

For rays passing farther away from the axis, the focal distance is shorter than that given by Equation 1. Therefore, there is no single figure that can be given as a focal distance of a sphere. Yet, for practical purposes, we want to know to what value of the effective index N the major part of the light flux is focused near to the back surface of the sphere. The calculation of the focal distances for the three peraxial rays was made for a series of refractive indices between 1 and 2. The results are plotted in FIG. 2. The "relative focal distance" is the focal distance measured from the back surface of the sphere, expressed in terms of a diameter D of the sphere. It is apparent that it takes an effective index of 2 to focus the axial rays at the back surface ($f/D=0$), while it is enough to have $N=1.8$ to reach the same condition in the 45° rays and only $N=1.4$ with the peripheral rays. The three cases are shown explicitly in FIGS. 3a, 3b and 3c. With $N=2$, all of the rays, with the exception of the narrow pencil of the axial rays, are focused inside of the sphere, and the concentrated light flux is spread over a small circular area over the back surface. With $N=1.4$, the situation is reversed; all of the rays are focused behind the sphere, with the exception of the peripheral rays. The net result, however, is roughly the same as in the first case, the strongly illuminated area being about the same size at the back surface of the sphere. The intermediate case with $N=1.8$ appears to give better focusing than either of the two extremes. Actually, a closer examination shows that it is more important to have a close focal distance for the light flux between the axial and the 45° rays than for the peripheral flux, because of the great loss by reflection at high angles of incidence. Consequently, an effective index between 1.8 and 2.0 is the optimum value.

If the glass beads are used in such a way that they are in contact with the light-reflecting layer at their back surface only, their front surface is exposed to the air ($n_0=1$). The refraction at the front surface is determined only the actual refractive index $n$ of the glass. As long as all rays are focused internally or at the back surface, the refractive index of the medium behind the beads need not be considered.

If the beads are covered over their front surfaces with a medium of a refractive index $n_0$, the index of glass is reduced to the value $N=n/n_0$. Most of the organic binders and transparent plastic materials have an index of refraction near 1.5. Beads made of glass with an index $n=1.9$ embedded in such a medium will have an effective index of only 1.27. According to FIG. 2, very poor focusing for the axial and the 45° rays will result. On the other hand, if an effective index of $N=1.8$ is desired, the glass should have the actual index of $n=1.8\times1.5=2.7$. The refractive index 2.7 should be considered the upper limit provided by the glasses of the invention.

Organic binders are used to cover the glass beads in order to reduce loss of optical properties in time due to dirt pickup, leaching, loss of beads, etc. The serious impairment of the light-focusing efficiency which results from the use of a plastic material in front of the beads can be corrected in two ways. First, the lengthening of a focal distance can be taken into account and a transparent spacing layer of suitable thickness can be provided between the beads and the reflecting layer. Second, the optical contact between the beads and the surrounding medium is broken by a thin layer of air; to this end, the surface of the beads is usually leached, so that it becomes somewhat porous. A superior technique for introducing air at the plastic-bead interface was developed by Hodgson et al. using larger glass beads to physically space the plastic top-coat above the smaller beads that are used for retro-reflective purposes.

Glass compositions of the prior art often utilize lead oxide in conjunction with bismuth oxide and titanium dioxide in order to achieve high indices of refraction. Lead oxide containing glasses have a characteristic light yellow color and are also hazardous to manufacture since the fumes of lead oxide given off in the smelting of lead oxide containing glasses present a health hazard. Additionally, the very high density of lead oxide containing glasses greatly reduces the coverage area obtained by users of glass beads made from such glasses. Since ultra-high-index glasses usually require very large quantities of RO type materials, of which lead oxide is representative, the glass bead making qualities of these glasses suffer due to the drastic reduction in the surface tension of the glass when lead oxide is present. Barium oxide on the other hand contributes at least three times as much more toward increasing the surface tension of the glass than does lead oxide with no noticeable increase in viscosity at atomization temperatures.

The greater the surface tension that a glass possesses, the greater the tendency the glass has to form rigid spheres from atomized, molten particles of the glass. The surface tension is in competition with the acceleration effects surrounding the molten particles of glass due to the atomizing force. If the particles are allowed to pass below the liquidus temperature of the glass while they are accelerating, irregular particles or glass fiber will be produced rather than glass beads, and it is the surface tension which tends to overcome these accelerating forces acting on the particles of molten glass. Inasmuch as glass beads produced from glass compositions of the prior art continue to form irregular glass particles, we saw the need for further improvement along these lines. Glass beads manufactured from the glass compositions of the invention overcome these difficulties in the prior art.

Our glass compositions are characterized by having good chemical and physical durability, good optical clarity, ultra-high-indices of refraction from about 1.8 to about 2.5, and in some cases, approaching 2.7, which are further characterized by having good glass bead making qualities such as high surface tension, low specific heat, and low density.

Specific heat is an important property of glasses which contain large quantities of titanium dioxide, barium oxide, and similar materials. The specific heat of a glass is correlated with its tendency to resist devitrification. In ordinary soda-lime-silica glasses, the viscosity is usually of such magnitude that the ions, which are moving in a random motion in the molten glass, do not have an opportunity to arrange themselves in a uniform manner necessary for crystallization or devitrification when the glass cools. Since the glasses that we seek must be fluid at furnace temperatures that are not excessive, so that they can be atomized readily, and do not possess and cannot possess a high viscosity such as the soda-lime-silica glass above, we must rely on rapid quenching to overcome the tendency of these glasses to devitrify. Rapid quenching of glass particles can be thought of in terms of viscosity since as the glass particles are rapidly cooled the viscosity very soon is sufficient to overcome the tendency of the ions to arrange themselves in an orderly manner. In other words, by rapid quenching of the glass beads or molten particles which are glass beads when spherulized and rigid, the "disorder" of the ions while in the molten state is "frozen in" and vitreous glass beads are formed.

To better understand the importance of specific heat and the correlation of specific heat to the cooling rate and therefore the vitreous character of the glass beads, let us compare two glass beads prepared from different glass compositions having different specific heats. Each of the two different glass beads weighs one gram. Let us further assume that one glass bead has a specific heat value of .2 calories per gram per ° C. (cal./gm./° C.) and that the other glass bead has a specific heat of .15. The glass bead with the lower specic heat requires less fuel than the glass bead having the higher specific heat per each ° C. rise in temperature. Conversely, since, generally, the two masses in cooling from a high temperature, $t_2$, to a lower temperature, $t_1$, will lose the same quantity of heat per unit time, it is sometimes difficult to realize that one actually cools more rapidly than the other. This can be explained as follows. When the two glass beads have lost .20 calories of heat in cooling from a high temperature $t_2$ to a low temperature $t_1$, the glass bead having a specific heat of .20 cal./gm./° C. has cooled 1° C. in temperature. However, the glass bead having a specific heat of .15 cal./gm./° C. has lost 1.25° C. in temperature during the same time interval. The glass bead having a specific heat of .15 is found to cool at a rate which is 25% greater than the glass bead having the specific heat value of .20.

A study of the phase diagram of barium oxide and titanium dioxide mixtures, which has been made by Rase and Roy, reveals a eutectic occurring at 1317° C. where the molar ratio of titanium dioxide to barium oxide is approximately 2:1. Considering only an additive relationship with reference to index of refraction of these two materials, an index of refraction of about 2.5 is indicated. However, glass melts prepared in platinum crucibles and porcelain crucibles failed to produce vitreous glass beads. Some glass was formed in very thin plates, but such glass was characterized by containing devitrified titanium dioxide dispersed within it. Further research revealed that when the titanium dioxide is essentially surrounded and saturated by oxygen, $TiO_6^{-8}$, glass formation occurs which is characterized by the absence of the devitrified titanium dioxide. We added additional oxygen to the system in the form of barium peroxide which was very satisfactory, and the glass that resulted when employing the 2:1 molar ratio of titanium dioxide to barium oxide had a measured index of refraction of about 2.1 or greater. The glass was further characterized by having excellent glass bead making properties, good optical clarity, relatively low density, and good chemical and physical durability. The glass beads produced from this glass composition are very satisfactory for sizes normally used in signs and sheeting, but in larger beads there was an increasing tendency to devitrify. Usable glass beads were also prepared using molar ratios of titanium dioxide to barium oxide from approximately 1:1 to about 2.2:1. We further found that the presence of a trace or more of a strong glass-forming material such as silicon dioxide, and to a lesser degree boron oxide, phosphoric oxide, and germanium oxide, assisted in the formation of glass beads from this binary system of barium peroxide and titanium dioxide, such glass beads being characterized by being of a vitreous character in larger sizes than that obtained when no strong glass-forming oxide such as silicon dioxide is used. Bismuth oxide was also utilized in quantities up to about 40% by weight with good results. The addition of bismuth oxide increases the refractive index of the system and further decreased the specific heat which results in a more rapid cooling rate. The unexpected result occurring with the use of bismuth oxide is an increase in refractive index above the value of any of the oxides present in the glass. For example, when about 12% bismuth oxide is combined with about 88% of a barium-titanium oxide mixture falling within the scope of the invention, an index of refraction greater than any of the oxides present is obtained. For example, a 2:1 molar ratio of titanium to barium has an index of refraction of about 2.4 and bismuth oxide has a refractive index of about 1.9, however, the above combination of these oxides results in a refractive index of about 2.5. Since glass beads of relatively small size can be produced within the scope of the invention having ultra high indices of refraction above 2.4 and further since larger particles are opaque or devitrified in nature, it is very difficult to determine the exact index of refraction of these glasses. A technique which we have developed enables us to approximate the index of refraction of these ultra high index glass beads by measuring the field of view obtained by these glasses. For example, very low index of refraction glass beads, relatively independent of size, and ultra-high index of refraction glass beads (above 1.9) have rather limited fields of view whereas a glass bead between 1.8 and 2.0 (index of refraction) appears to have an extremely large field of view. By using glass beads of predetermined index of refraction and plotting these values on a curve and comparing the relative field of view of the glass beads of unknown index of refraction with those of known indices of refraction we can approximate fairly close to the actual index of refraction of these ultra high index glass beads.

In order to obtain large masses of vitreous glass useful for the manufacture of large glass beads, antimony oxide is utilized in the composition of the invention up to about 40% by weight with very good results. Preferably, as bismuth oxide is increased in these glass compositions antimony oxide should also be present to obtain the best results. Both antimony oxide and bismuth oxide melt at low temperatures and antimony oxide is also a strong glass forming material.

Table 1 contains some representative examples of glass compositions, in parts by weight, which fall within the scope of the invention.

Generally, the glass compositions of our invention may be described as follows: A vitreous mixture of the oxides

TABLE 1

| Ex. | $TiO_2$ | $BaO_2$ | BaO | $Bi_2O_3$ | | |
|---|---|---|---|---|---|---|
| 1 | 24 | 46 | | 29 | $B_2O_3$–1 | |
| 2 | 36 | 38 | | 20 | $Li_2O$–5 | $SiO_2$–1 |
| 3 | 24 | 46 | | 28 | $Li_2O$–2 | |
| 4 | 48 | 46 | | | $Na_2O$–1 | $SiO_2$–5 |
| 5 | 48 | 23 | 23 | | $Na_2O$–1 | $SiO_2$–5 |
| 6 | 48 | 11 | 30 | | $Na_2O$–1 | $SiO_2$–5, CaO–4.5 |
| 7 | 48 | 5 | 35 | | $Na_2O$–1 | $SiO_2$–5, CaO–6 |
| 8 | 46.3 | 48.7 | | 5 | | |
| 9 | 46 | 44 | | 10 | | |
| 10 | 40.8 | 39.2 | | 20 | | |
| 11 | 35.7 | 34.3 | | 30 | | |
| 12 | 30.6 | 29.4 | | 40 | | |
| 13 | 22.7 | 42.7 | | 35 | | |
| 14 | 40.5 | 34.5 | | 25 | | |
| 15 | 46.3 | 48.7 | | | $Sb_2O_3$–5 | |
| 16 | 46 | 44 | | | $Sb_2O_3$–10 | |
| 17 | 40.8 | 39.2 | | | $Sb_2O_3$–20 | |
| 18 | 35.7 | 34.3 | | | $Sb_2O_3$–30 | |
| 19 | 30.6 | 29.4 | | | $Sb_2O_3$–40 | |
| 20 | 40.5 | 34.5 | | | $Sb_2O_3$ 25 | |
| 21 | 30.6 | 29.4 | | 5 | $Sb_2O_3$–35 | |
| 22 | 30.6 | 29.4 | | 15 | $Sb_2O_3$–25 | |
| 23 | 30.6 | 29.4 | | 25 | $Sb_2O_3$–15 | |
| 24 | 40.5 | 34.5 | | 20 | $Sb_2O_3$–5 | |
| 25 | 40.5 | 34.5 | | 15 | $Sb_2O_3$–10 | |
| 26 | 51.4 | 48.6 | | | | |
| 27 | 51.3 | 48.5 | | | | $SiO_2$–0.2 |
| 28 | 35.6 | 34.2 | | 30 | | $GeO_2$–0.2 |
| 29 | 30.4 | 29.1 | | 15 | $Sb_2O_3$–25 | $GeO_2$–0.5 | of titanium dioxide and at least one RO or (RO)O type material where R is preferably barium in a molar ratio of titanium dioxide to (RO)O from 0.9 to 2.2 in combination with from about 0.2% by weight to about 8.0% by weight of at least one of the oxides of silica, boron, phosphorus, and germanium.

More specifically, the glass compositions of the invention can be described as indicated by the following table:

|  | Percent by weight |
|---|---|
| $TiO_2$/(RO)O (from about 0.9–2.2 molar ratio) | 60–100 |
| $Bi_2O_3$+$Sb_2O_3$/$Sb_2O_5$ | 0–40 |
| $Li_2O$+$Na_2O$+$K_2O$ | 0–60 |
| $SiO_2$+$B_2O_3$+$P_2O_5$+$GeO_2$ | 0.2–12 |

Preferably, at least one oxide from the group consisting of silicon dioxide, boric oxide, phosphoric oxide, and germanium dioxide is present in a range from about 0.2% by weight to about 8% by weight.

The designation (RO)O stands for a peroxide of one of the alkaline earth metal oxides such as calcium, strontium, and barium, or zinc, lead, and cadmium. Lead oxide or lead peroxide is preferably deleted from glass compositions of the invention except when the object to be reflectorized with these glass beads is completely weather-proof and air tight from the point of view of atmospheric air which often contains sulfide fumes and result in darkening or causing the glass beads to turn black. Also, lead oxide is a very heavy metal oxide and appreciably increases the unit weight:volume when compared with other lower density materials. Cadmium oxide or cadmium peroxide generally increases the liquidus temperature of the glass as does zinc oxide when present in substantial quantity. Zinc oxide can be used up to about 15% by weight in the glass compositions of the invention without deleteriously affecting the glass properties. Strontium oxide or peroxide more nearly approaches the properties of barium oxide or peroxide than other RO or (RO)O type materials except for cost, strontium costing significantly more than barium. Calcium oxide in quantities up to about 20% by weight tend to flux the barium-titanium oxide system, especially when a strong glass forming material is present, such as silicon dioxide.

The following table further describes glass compositions of the invention:

|  | Percent by weight |
|---|---|
| Titanium dioxide/(Barium oxide)O+(Calcium oxide)O (from about 0.9–2.2 molar ratio) | 60–100 |
| Bismuth oxide+antimony oxide | 0–40 |
| Lithium oxide+sodium oxide+potassium oxide | 0–6 |
| Silicon dioxide+boric oxide+phosphoric oxide +germanium dioxide | 0.2–8 | where the index of refraction is in the range of from about 1.8 to about 2.6 and the titanium ion is present, preponderantly, as $TiO_6^{-8}$.

It has been found that antimony oxide and bismuth oxide have a tendency to solarize or become darkened when exposed to ultra-violet light rays. Fortunately, only a minute quantity of ultra-violet light is present in the rays from the sun. However, we find that these oxides are only slightly darkened, and in many cases not darkened at all, when well known ultra-violet light absorbing material is incorporated in the transparent, organic covering that is placed over the beads, as in sheeting used in preparing traffic signs.

The glass compositions of the invention may be prepared by melting a mix of the batch components in a conventional glass furnace made of conventional heat resistant refractories free from deleterious contaminating material, particularly iron. The batch is composed of oxides or compounds decomposable to oxides under the conditions of melting in the proper proportion to yield the specified compositions. In general, titanium, bismuth, antimony and germanium are added as oxides; barium is added in whole or in part as the peroxide, the remainder as oxide or carbonate; calcium, sodium and lithium may be conveniently used as carbonates; silica may be added as high grade quartz sand and boron may be added as boric acid.

The glass compositions of the invention melt at temperatures within the range of 1100–1400° C. The batch mix is preferably added to the furnace continuously, or in successive increments allowing each increment to melt before the next increment is added, until the glass melt is brought to the desired level which may require from 4 to 10 hours.

After the melt has been prepared it can be converted to glass beads by conventional methods either directly from the melt or by pouring a stream of the molten glass into water to form a cullet, particles of which are blown or dropped through a high temperature flame or a radiant heating zone to soften them sufficiently to form spheres by the action of surface tension followed by rapid cooling to harden the spheres without devitrification.

We claim:
1. A high refractive index glass composition consisting essentially of a vitreous fusion product of a mixture of titanium oxide and barium peroxide in the molar ratio greater than 2.0 and up to 2.2, and wherein the titanium ion is present, preponderantly, as $TiO_6^{-8}$.

2. A high refractive index glass composition consisting essentially of from about 60% to about 100% by weight of a vitreous fusion product of a mixture of titanium oxide and barium peroxide in the molar ratio of from about 0.9 to about 2.2 from about 0 to about 40% by weight of at least one oxide selected from the group consisting of bismuth oxide and antimony oxides, from 0 to about 6% by weight of at least one alkali metal oxide of the group consisting of lithium, sodium and potassium oxides and from about 0.2 to about 12% by weight of at least one oxide selected from the group consisting of silicon dioxide, boric oxide, phosphoric oxide and germanium dioxide, and wherein the titanium ion is present, preponderantly, as $TiO_6^{-8}$.

3. A high refractive index glass composition consisting essentially of from about 60% to about 75% by weight of a vitreous fusion product of a mixture of titanium oxide and barium peroxide in the molar ratio of from about 0.9 to about 2.2 and from about 25% to about 40% by weight of at least one oxide selected from the group consisting of bismuth oxide and antimony oxides, and wherein the titanium ion is present, preponderantly, as $TiO_6^{-8}$.

References Cited

UNITED STATES PATENTS

| | | | |
|---|---|---|---|
| 2,992,122 | 7/1961 | Beck et al. | 106—53 |
| 3,293,051 | 12/1966 | Searight et al. | 106—47 |
| 2,774,675 | 12/1956 | Slayter | 106—47 |
| 2,870,030 | 1/1959 | Stradley et al. | 106—47 |
| 2,980,547 | 4/1961 | d'Adrian | 106—47 |
| 3,041,191 | 6/1962 | d'Adrian | 106—47 |
| 2,584,974 | 2/1952 | Armistead | 106—54 |

FOREIGN PATENTS

| | | |
|---|---|---|
| 571,033 | 12/1957 | Italy. |
| 540,633 | 5/1957 | Canada. |

HELEN M. McCARTHY, *Primary Examiner.*

U.S. Cl. X.R.

106—52, 53, 54